United States Patent
Liu

(10) Patent No.: US 7,725,143 B2
(45) Date of Patent: May 25, 2010

(54) SPRING LOADED SLIDING COVER FOR MOBILE PHONE OR PDA

(76) Inventor: Yen-Tung Liu, No. 6, Lane 286, Tatung Rd., Sec. 1, Shichi, Taipei Hsien (TW) 22145

( * ) Notice: Subject to any disclaimer, the term of this patent is extended or adjusted under 35 U.S.C. 154(b) by 544 days.

(21) Appl. No.: 11/822,763

(22) Filed: Jul. 10, 2007

(65) Prior Publication Data

US 2009/0016029 A1    Jan. 15, 2009

(51) Int. Cl.
*H04M 1/00*    (2006.01)

(52) U.S. Cl. .............. 455/575.4; 455/575.1; 455/575.8; 455/90.3

(58) Field of Classification Search ........................ None
See application file for complete search history.

(56) References Cited

U.S. PATENT DOCUMENTS

| 7,583,989 B2* | 9/2009 | Lee et al. .................. 455/575.4 |
| 2007/0155216 A1* | 7/2007 | Juan et al. .................... 439/352 |

* cited by examiner

*Primary Examiner*—Erika A Gary
(74) *Attorney, Agent, or Firm*—Bacon & Thomas, PLLC

(57) ABSTRACT

A cover mounted on a top surface of either mobile phone or PDA includes a top member; a bottom member fixedly mounted on the top surface and including two inner slide members on both sides; an intermediate member fixedly secured to the top member and partially disposed on the bottom member, the intermediate member including two outer slide members on both sides; and an elastic assembly including left and right elastic members including a triangular section at one end secured to the bottom member, a U-shaped intermediate section, and a straight section at the other end secured to the intermediate member. Pulling the top member will slide the intermediate member away from the bottom member by moving the outer slide members on the inner slide members by expanding the elastic assembly. Releasing the top member will elastically return the intermediate member to its original position.

2 Claims, 5 Drawing Sheets

SPRING LOADED SLIDING COVER FOR MOBILE PHONE OR PDA

BACKGROUND OF THE INVENTION

1. Field of Invention

The invention relates to sliding covers for portable electronic devices and more particularly to a spring loaded sliding cover for a mobile phone or PDA (Personal Digital Assistant) with improved characteristics.

2. Description of Related Art

The availability of various electronic products is even faster as technologies make progress significantly in recent several decades. As a result, a lot of convenience is brought to our daily life and living quality is improved significantly. Moreover, such new electronic products are closely tied to our daily life and work. For example, some types of consumer-oriented portable electronic products (e.g., PDAs (Personal Digital Assistants), mobile phones, etc.) are widely used today. Such electronic products are characterized in being compact and lightweight.

One type of conventional mobile phone has a hinged cover. The other type thereof has a spring loaded sliding cover. However, the well known spring mechanism employed by the mobile phone is typically relatively complex in constructions, costly to manufacture, trouble-prone, and unreliable in use. Thus, the need for improvement still exists.

SUMMARY OF THE INVENTION

It is therefore one object of the invention to provide a spring loaded sliding cover for a mobile phone or PDA having the advantages of being smooth in operation and durable.

The above and other objects, features and advantages of the invention will become apparent from the following detailed description taken with the accompanying drawings.

DETAILED DESCRIPTION OF THE INVENTION

Figure 1:
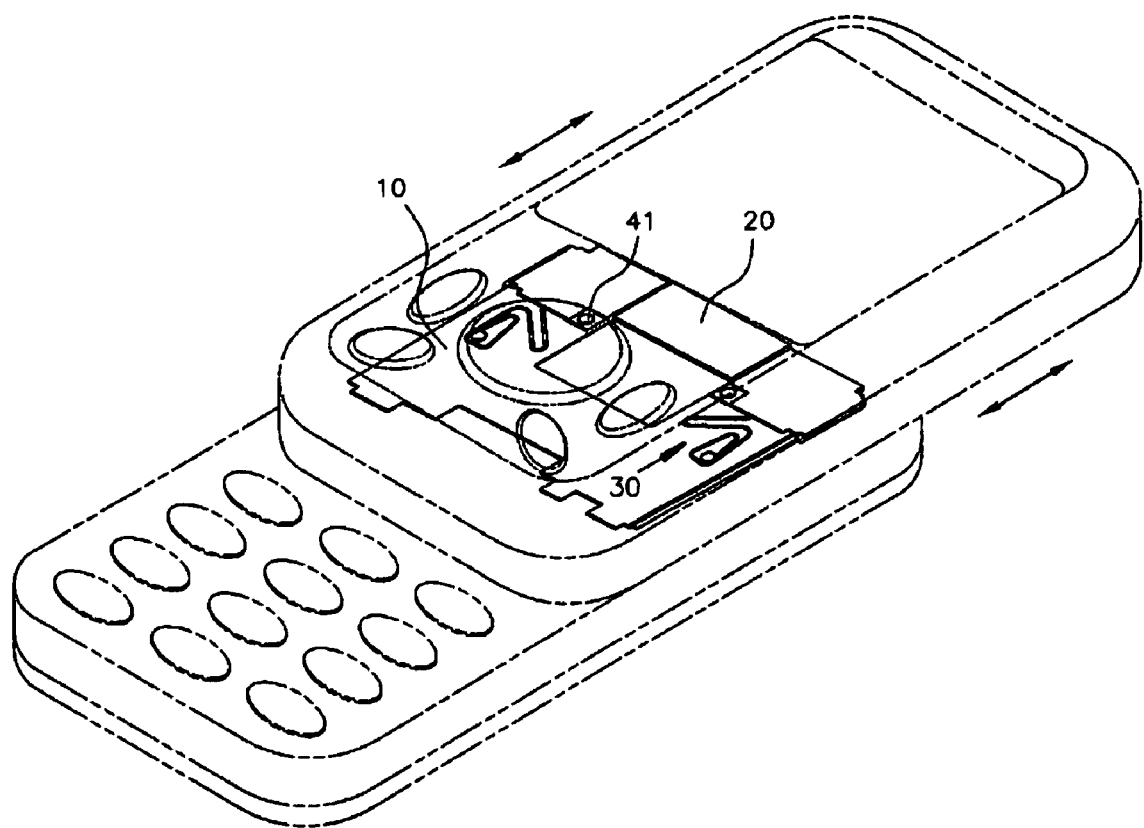
FIG. 1 is a schematic perspective view of a mobile phone incorporated a sliding cover according to the invention where the cover is partially open.
Figure 2:
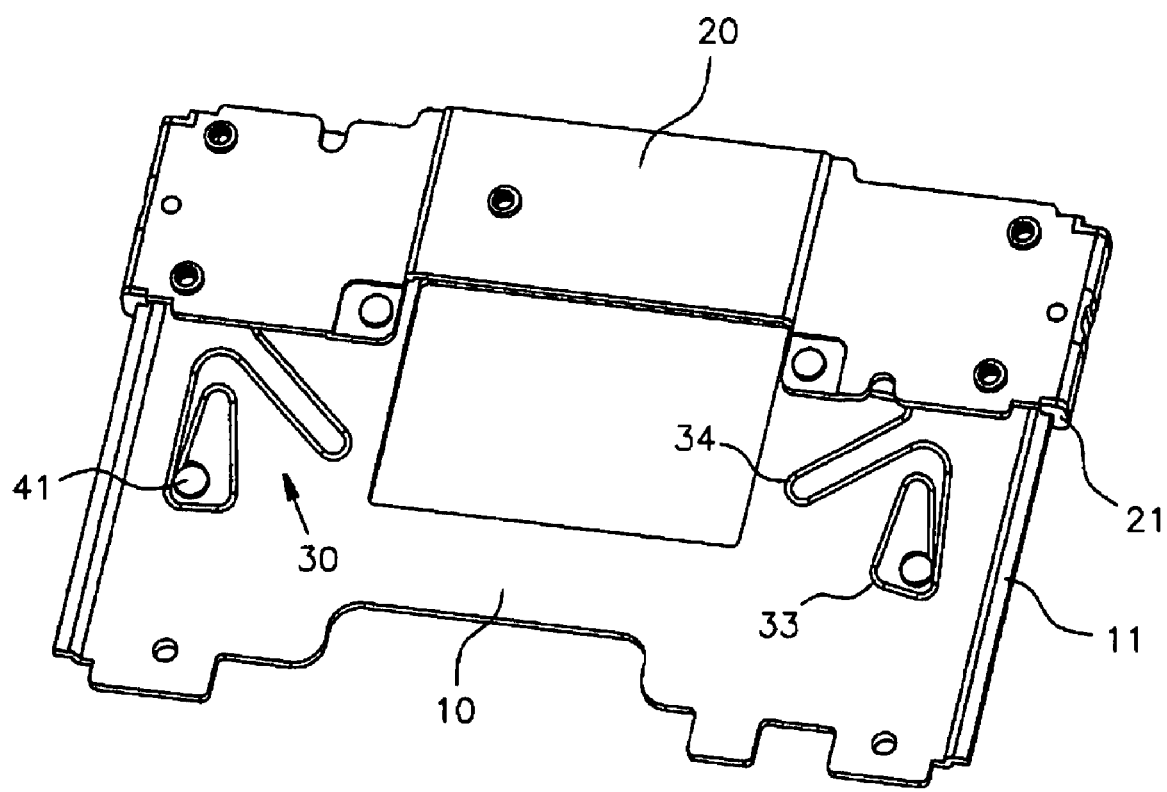
FIG. 2 is a perspective view of a mechanism for effecting the sliding of the sliding cover in FIG. 1.
Figure 3:
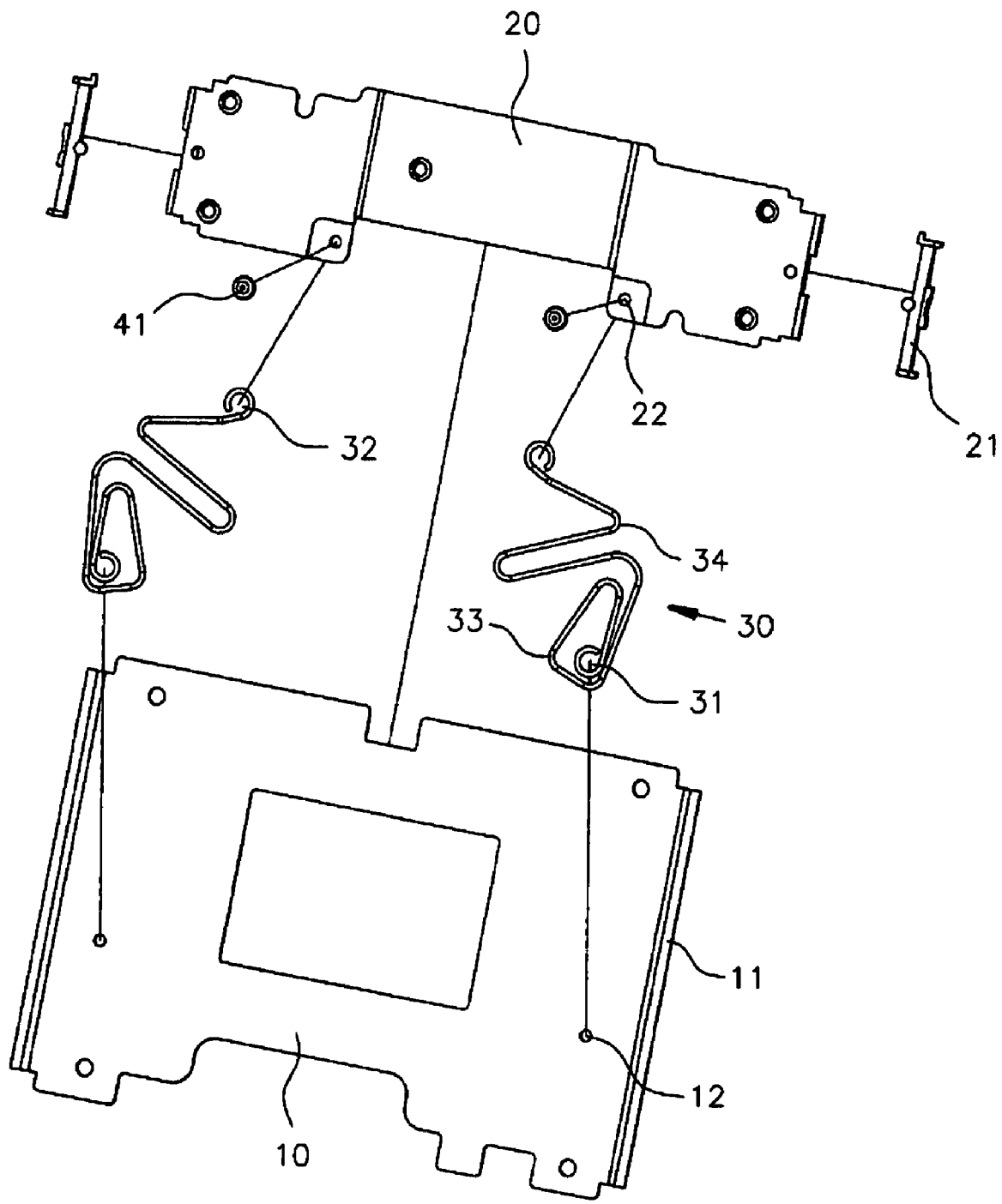
FIG. 3 is an exploded view of the mechanism in FIG. 2.
Figure 4:
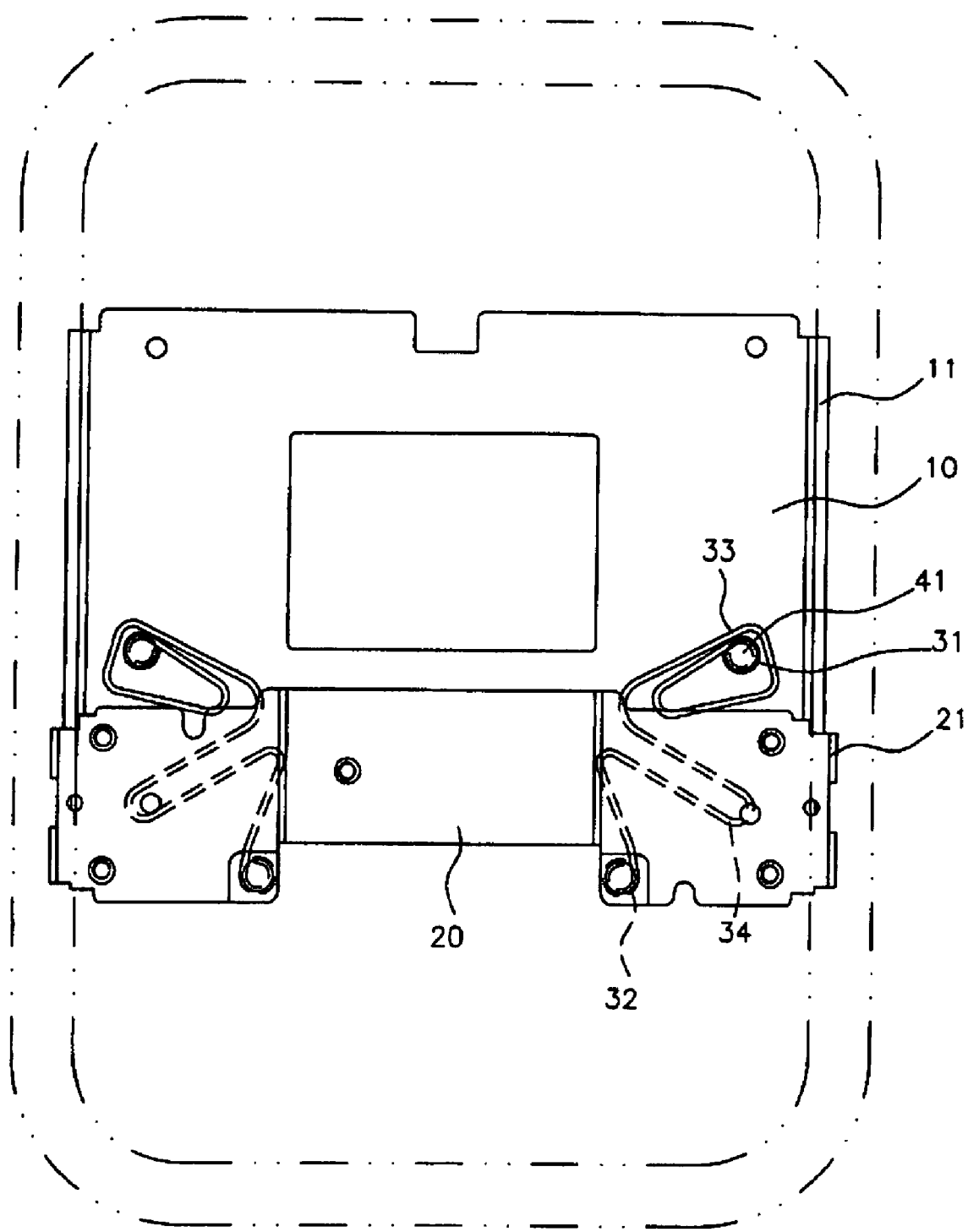
FIG. 4 is a schematic top view of the mechanism in FIG. 2 where the cover is closed.

Referring to FIGS. 1 to 5, a mobile phone incorporated a sliding cover according to a preferred embodiment of the invention is shown. Note that the sliding cover can also be mounted in a portable electronic device (e.g., PDA or the like) in other preferred embodiments of the invention. A mechanism for effecting the sliding of the sliding cover comprises a substantially rectangular bottom member 10 fixedly mounted on a top surface of a body of the mobile phone. The bottom member 10 comprises two inner slide members 11 on both sides, and two holes 12 adjacent two sides.

The mechanism further comprises a substantially rectangular top member 20 fixedly secured to a bottom of the cover. The top member 20 comprises two grooved outer slide members 21 on both sides, and two opposite holes 22 each disposed about a midway between either side and a lengthwise center line.

The mechanism further comprises an elastic assembly 30 including left and right units each including a spring including a triangular section 33 at one end and having a hooked end portion 31 secured to the holes 12 by means of a fastener (not shown), a U-shaped intermediate section 34, and a straight section at the other end and having a hooked end portion 32 secured to the hole 22 by means of a fastener (e.g., rivet) 41. Preferably, the triangular section is an isosceles triangle.

The top member 20 is smaller than the bottom member 10 and is partially disposed thereon. The outer slide members 21 are dimensioned and shaped to matingly fit on the inner slide members 11.

Figure 5:
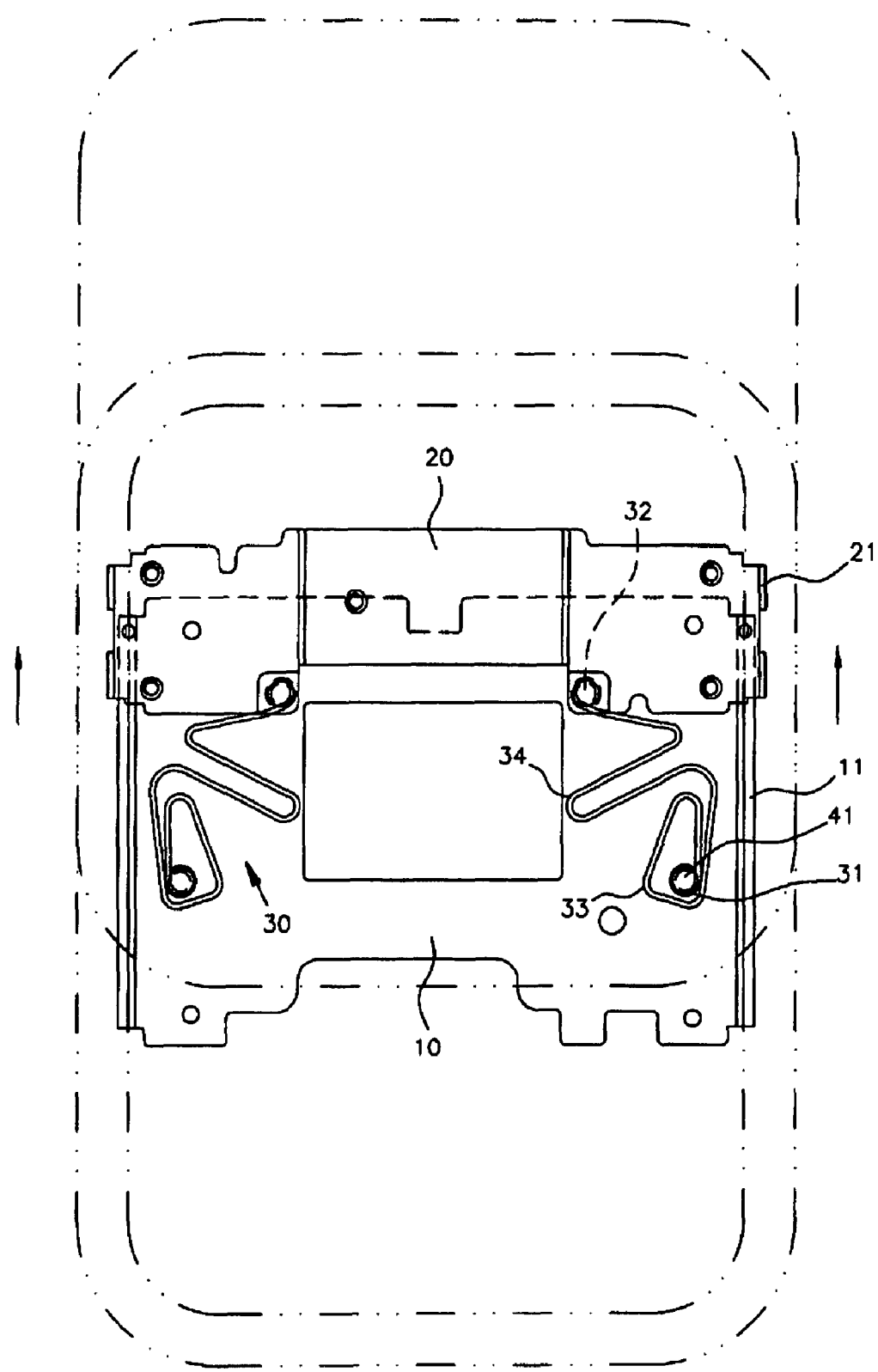
FIG. 5 is a view similar to FIG. 4 where the cover is being opened.

A sliding operation of the invention will be described in detail below. A user may pull the cover to cause the top member 20 to slide away from the bottom member 10 by moving the outer slide members 21 on the inner slide members 11 by expanding the elastic assembly 30 as shown in FIG. 5. It is understood that releasing the cover will slide the top member 20 back to its original position by releasing the stored elastic force of the elastic assembly 30.

While the invention herein disclosed has been described by means of specific embodiments, numerous modifications and variations could be made thereto by those skilled in the art without departing from the scope and spirit of the invention set forth in the claims.

What is claimed is:

1. A cover of substantially rectangular size mountable on a top surface of either a mobile phone or a PDA (Personal Digital Assistant), comprising:

a top member;

a bottom member fixedly mounted on the top surface and including two inner slide members on both sides;

an intermediate member fixedly secured to the top member and partially disposed on the bottom member, the intermediate member including two outer slide members on both sides; and an elastic assembly including left and right units each including an elastic member including a triangular section at one end secured to the bottom member, a U-shaped intermediate section, and a straight section at the other end secured to the intermediate member, whereby pulling the top member will cause the intermediate member to slide away from the bottom member by slidably moving the outer slide members on the inner slide members by expanding the elastic assembly thereby creating a stored elastic force, and releasing the top member will slide the intermediate member back to its original position by releasing the stored elastic force of the elastic assembly.

2. The cover of claim 1, wherein the triangular section is an isosceles triangle.

* * * * *